United States Patent
Fincato et al.

(10) Patent No.: US 9,557,487 B2
(45) Date of Patent: Jan. 31, 2017

(54) ARRAYED WAVEGUIDE GRATING MULTIPLEXER-DEMULTIPLEXER AND RELATED CONTROL METHOD

(71) Applicants: STMICROELECTRONICS (CROLLES 2) SAS, Crolles (FR); STMICROELECTRONICS S.r.l., Agrate Brianza (MB) (IT)

(72) Inventors: Antonio Fincato, Cameri (IT); Charles Baudot, Lumbin (FR)

(73) Assignees: STMICROELECTRONICS S.R.L., Agrate Brianza (MB) (IT); STMICROELECTRONICS (CROLLES 2) SAS, Crolles (FR)

( * ) Notice: Subject to any disclaimer, the term of this patent is extended or adjusted under 35 U.S.C. 154(b) by 45 days.

(21) Appl. No.: 14/672,378

(22) Filed: Mar. 30, 2015

(65) Prior Publication Data
US 2015/0309258 A1    Oct. 29, 2015

(30) Foreign Application Priority Data
Apr. 29, 2014   (IT) .............. MI2014A0787

(51) Int. Cl.
*H04J 14/02*   (2006.01)
*G02B 6/293*   (2006.01)
*G02F 1/01*    (2006.01)
*G02B 6/12*    (2006.01)

(52) U.S. Cl.
CPC ......... *G02B 6/2938* (2013.01); *G02B 6/12011* (2013.01); *G02B 6/12033* (2013.01); *G02B 6/29307* (2013.01); *G02F 1/0115* (2013.01); *H04J 14/02* (2013.01); *G02B 6/12026* (2013.01)

(58) Field of Classification Search
CPC ............................... H04J 14/02; G02B 6/2938
See application file for complete search history.

(56) References Cited

U.S. PATENT DOCUMENTS

| | | | |
|---|---|---|---|
| 5,559,906 A | 9/1996 | Maerz | |
| 7,139,455 B1 | 11/2006 | Gunn, III et al. | |
| 2003/0026546 A1* | 2/2003 | Deliwala | G02F 1/025 385/40 |
| 2003/0095737 A1* | 5/2003 | Welch | B82Y 20/00 385/14 |
| 2004/0223710 A1* | 11/2004 | Bhowmik | G02F 1/365 385/122 |
| 2005/0089273 A1* | 4/2005 | Squires | G02B 6/12019 385/37 |

(Continued)

OTHER PUBLICATIONS

Haung et al., "A 10Gb/s photonic modulator and WDM MUX/DEMUX integrated with electronics in 0.13 μm SOI CMOS", ISSCC 2006, Session 13, Optical communication, 13.7; pp. 24-25.

(Continued)

*Primary Examiner* — Dzung Tran
(74) *Attorney, Agent, or Firm* — Allen, Dyer, Doppelt, Milbrath & Gilchrist, P.A.

(57) ABSTRACT

An arrayed waveguide grating multiplexer/demultiplexer includes an array of optical waveguides ordered in sequence from a shortest waveguide up to a longest waveguide, and identical phase shifters configured to be controlled by a same control signal. Each phase shifter increases/decreases an optical path of an optical waveguide by the same quantity based on the control signal.

18 Claims, 8 Drawing Sheets

(56) References Cited

U.S. PATENT DOCUMENTS

2006/0279734 A1\* 12/2006 Yan .................... G02B 6/12026
356/329
2008/0219668 A1\* 9/2008 Barbarossa ........ G02B 6/12023
398/87

OTHER PUBLICATIONS

Bi Ssessur H et al. "Tunable phased-array wavelength demultiplexer on InP ": Electronics Letters. IEE Stevenage, GB, vol. 31, No. 1, Jan. 5, 1995 (Jan. 5, 1995). pp. 32-33. XP006002300, ISSN: 0013-5194. DOI: 10.1049/EL:19950041.

\* cited by examiner

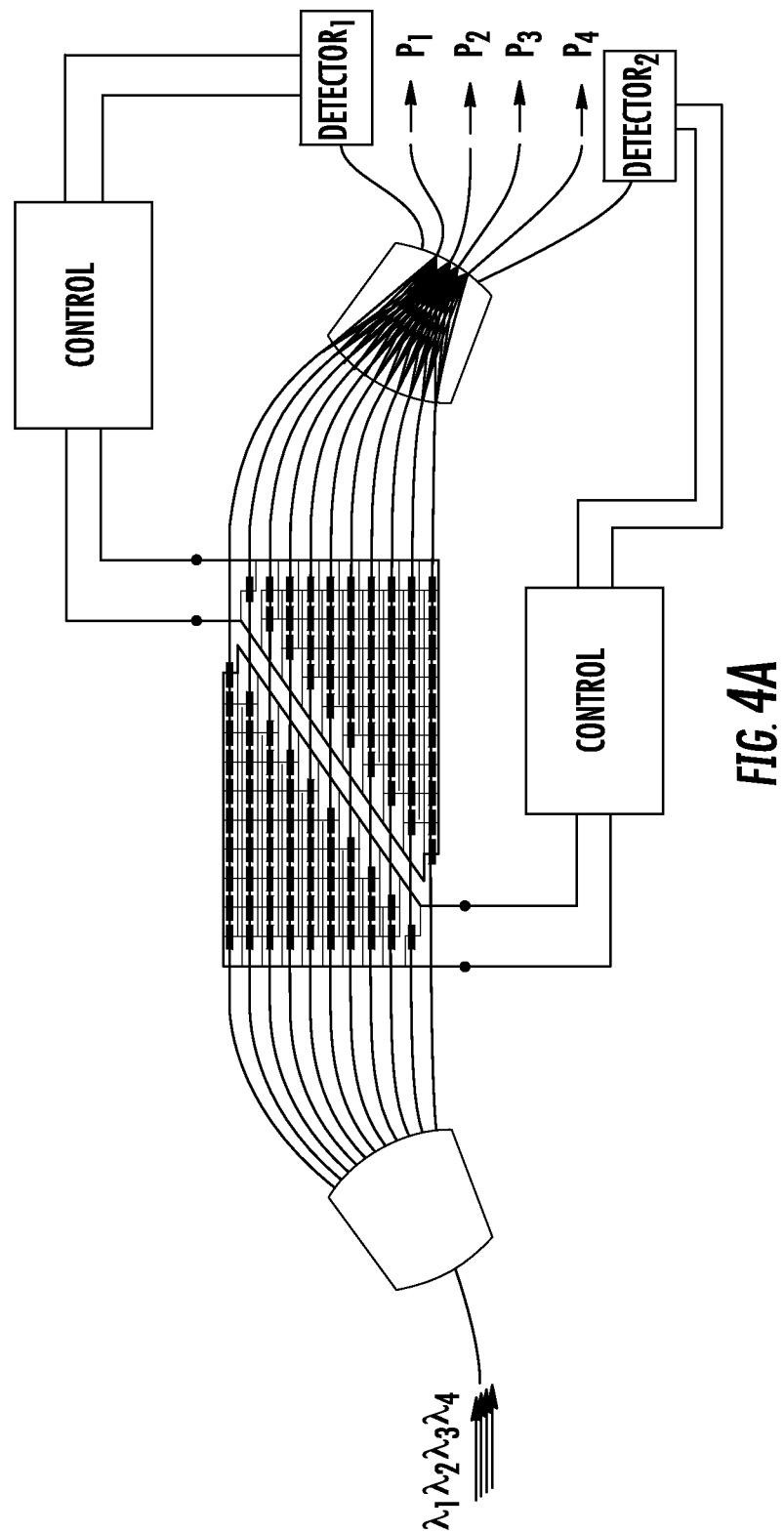

ARRAYED WAVEGUIDE GRATING MULTIPLEXER-DEMULTIPLEXER AND RELATED CONTROL METHOD

FIELD OF THE INVENTION

The present disclosure relates to electro-optical devices, and more particularly, to a wavelength division multiplexer or demultiplexer based on arrayed waveguide gratings, and to a method of controlling an arrayed waveguide grating multiplexer or demultiplexer.

BACKGROUND

Transmission systems on optical fiber predominantly use predetermined windows (i.e., bands, channels) of the optical spectrum through which the transmission of the signals along the fibers takes place with minimum attenuation. Signals or communication channels, each with its own precisely defined wavelength as produced by a relevant laser generator, included in one of these windows or bands may be transmitted along an optical fiber with extremely low losses. The simultaneous transmission of various communication channels belonging to a certain band, window or channel on a same fiber is made possible by Wavelength Division Multiplexing (WDM).

Arrayed Waveguide Gratings (AWG) are devices capable of multiplexing a plurality of optical signals at different wavelengths into a single optical fiber, and demultiplexing optical signals at different wavelengths transmitted over a single optical fiber. As a result of this property, they may be used in particular as wavelength division demultiplexers to retrieve individual channels of different wavelengths at the receiving end of an optical communication network.

A schematic diagram of an arrayed waveguide grating (AWG) demultiplexer is shown in FIG. 1. It substantially comprises a first slab waveguide 1 defining a first free propagation region (FPR), a second slab waveguide 2 defining a second free propagation region coupled to the first slab waveguide 1 through an array of optical waveguides 3. The first slab waveguide 1 is coupled to receive multiplexed optical signals of different wavelengths $\lambda_1, \lambda_2, \lambda_3, \lambda_4$, for example, conveyed through a first optical waveguide 4, and to irradiate them towards first end portions of the waveguides 3. The optical waveguides of the array define optical paths of different lengths. More precisely, each waveguide of the array is shorter by the same fixed length $\Delta L$ than the longer adjacent waveguide. Each waveguide is longer by a fixed length $\Delta L$ than the shorter adjacent waveguide, except the shortest waveguide.

When the optical signals have crossed the arrayed waveguides, they reach the second end portion thereof from which they are irradiated through the second free propagation region of the second slab waveguide 2. Optical signals of a same wavelength constructively interfere with a maximum intensity at a respective main focal spot located in a position that depends on the wavelength, as shown in FIG. 1.

This device is sensitive to temperature variations or process spread. As schematically shown in FIGS. 2a and 2b, temperature variations may change the optical path difference $n_{eff} \cdot \Delta L$ between adjacent waveguides, with $n_{eff}$ being the effective refractive index of the waveguides. As a consequence, the focal spots of the demultiplexed optical signals may be shifted clockwise or counter-clockwise depending on the variation of the effective refractive index $n_{eff}$ upon temperature. To prevent information losses, the number of optical signals at different wavelengths that may be transmitted on a same optical fiber is smaller than the maximum number that in theory could be allowed in absence of temperature variations.

An AWG device is disclosed in the article by Andrew Hang, Cary Gunn, Guo-Liang Li, Yi Liang, Sina Mirsaidi, Adithyaram Narasimha, Thierry Pinguet, "A 10 Gb/s photonic modulator and WDM MUX/DEMUX integrated with electronics in 0.13 μm SOI CMOS", ISSCC 2006, Session 13, Optical communication, 13.7. This prior AWG has one single array of identical PIN junction phase modulators individually controlled by a dedicated DAC integrated into each arm of the AWG, and may be used to restore the phase relationship of the light due to errors in fabrication of optical waveguides that induce random delays to the optical signal.

In this case, the errors in fabrication may randomly effect any waveguide and, if required, a correction needs to be applied individually on each arm of the AWG. The number of waveguides can easily grow up to 100 or more, and the algorithm and the electronics dedicated to controlling all the DACs become too complex to be practically formed.

SUMMARY

An arrayed waveguide grating multiplexer-demultiplexer, and a method of controlling the same, for compensating the effect of temperature fluctuations are provided.

The method comprises the steps of providing and coupling at least a first phase shifter to the shortest/longest waveguide, and providing and coupling, for each optical waveguide but the shortest/longest waveguide, a number of phase shifters identical to the first phase shifter. This number my be greater by a constant integer than the number of identical phase shifters coupled to the longest/shortest one of the smaller/greater optical waveguides of the array. All of the identical phase shifters may receive a same control signal to make each phase shifter increase/decrease by a same amount, as determined by the control signal. The control signal may be received over the optical path of the optical waveguide to which it is coupled.

An arrayed waveguide grating demultiplexer suitable for implementing the above method may differ from the prior demultiplexer of FIG. 1 because it comprises a plurality of identical phase shifters configured to be commanded with the same control signal. Each phase shifter may be configured to increase/decrease by substantially the same amount, as determined by the control signal. At least a phase shifter may be coupled to the shortest/longest waveguide. Each optical waveguide but the shortest/longest waveguide may be coupled to a number of identical phase shifters greater by a constant integer than the number of identical phase shifters respectively coupled to the longest/shortest one of the smaller/greater optical waveguides of the array.

According to an embodiment, the arrayed waveguide grating demultiplexer may comprise a photo-detector placed at a position located beyond an outermost of the main focal spots of the second free propagation region so as to not be illuminated in normal functioning conditions, and to be illuminated when the arrayed waveguide grating demultiplexer undergoes a temperature variation greater than a minimum threshold. The photo-detector may be configured to generate an electrical error signal corresponding to the intensity of an optical signal impinging thereon. A control block may be configured to receive the electrical error signal as an input, and to generate the control signal.

According to another embodiment, in operation, components of a same wavelength as the output optical signals may also constructively interfere with a reduced intensity at a respective secondary focal spot located in a position of the second free propagation region depending on the wavelength. The arrayed waveguide grating demultiplexer may comprise a plurality of photo-detectors, each placed at the position of a respective secondary focal spot and configured to generate a respective electrical error signal corresponding to the intensity of an optical signal impinging thereon. A control block may be configured to receive all the electrical error signals as input, and to generate the control signal.

According to yet another embodiment, the arrayed waveguide grating demultiplexer may comprise a laser source placed in correspondence of a respective main focal spot of the second free propagation region. The laser source may be configured to irradiate an optical reference signal from the second free propagation region to the first free propagation region throughout the array of optical waveguides. In operation, components of a same wavelength of the optical reference signal may constructively interfere with a maximum intensity at a respective main focal spot located in a position of the first free propagation region depending on the wavelength. A plurality of photo-detectors may be placed in correspondence of a respective one of the main focal spots of the first free propagation region. Each of the photo-detectors may be configured to generate a respective electrical error signal corresponding to the intensity of an optical signal impinging thereon. A control block may be configured to receive all the electrical error signals as input, and to generate the control signal.

BRIEF DESCRIPTION OF THE DRAWINGS

FIG. 4a depicts an embodiment of the arrayed waveguide grating demultiplexer according to the present disclosure.

FIG. 5b is a graph intensity-position of the main focal spots and of the secondary focal spots of the second free propagation region of the arrayed waveguide grating demultiplexer of FIG. 5a.

FIG. 5c shows a multi-port detector that may be used at the second free propagation region of the arrayed waveguide grating demultiplexer of FIG. 5a.

DETAILED DESCRIPTION

Figure 1:
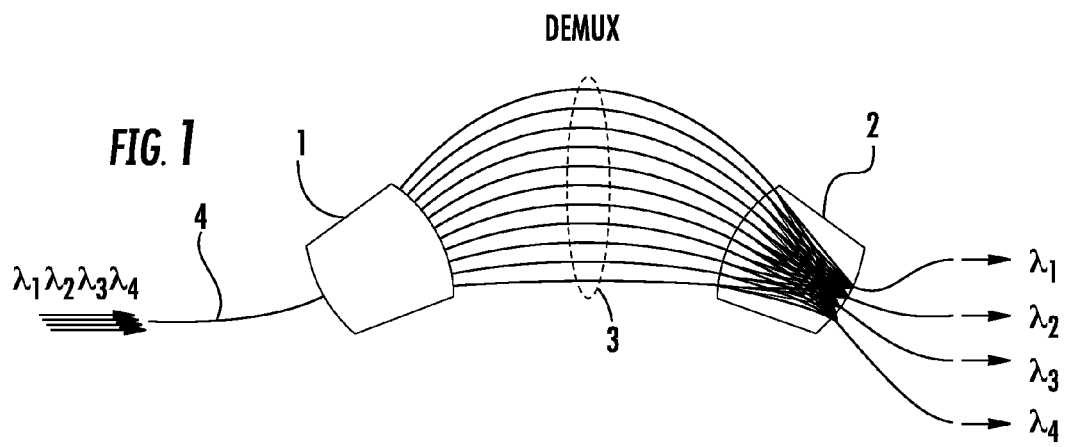
FIG. 1 shows a schematic diagram of an arrayed waveguide grating demultiplexer according to the prior art.
Figure 2A:
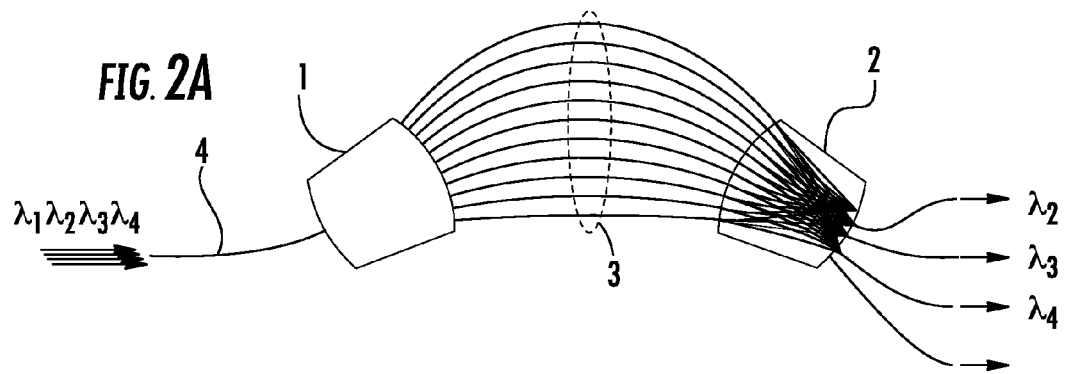
FIGS. 2a and 2b illustrate exemplary effects of temperature fluctuations in an arrayed waveguide grating demultiplexer according to the prior art.
Figure 2B:
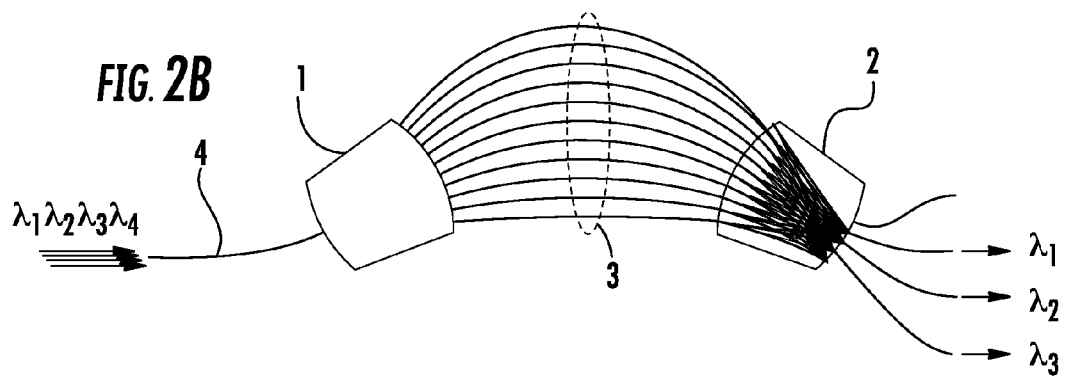
Figure 3:
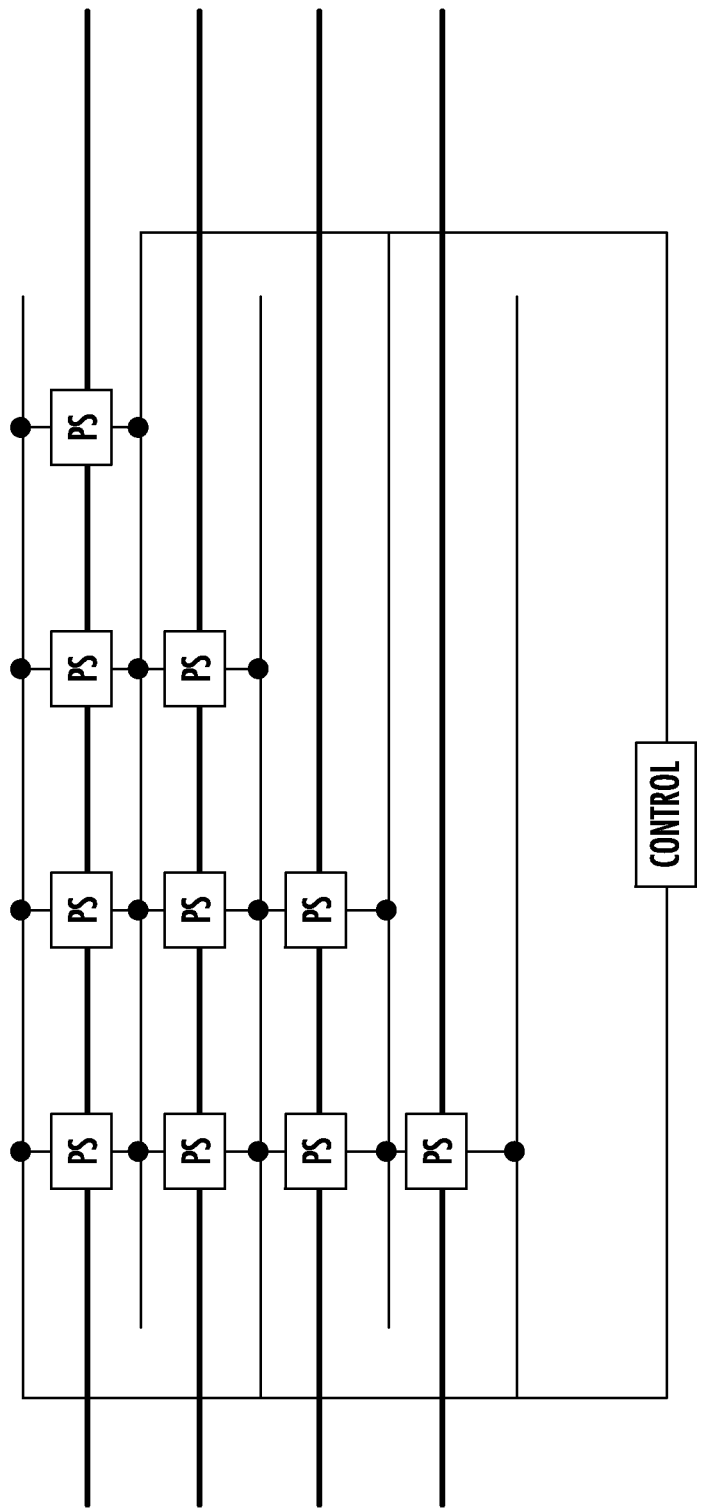
FIG. 3 illustrates how identical phase shifters are coupled together and to the optical waveguides of the arrayed waveguide grating demultiplexer depending on their lengths, according to the present disclosure.

An arrayed waveguide grating multiplexer/demultiplexer in which it is possible to compensate with great accuracy effects of temperature fluctuations comprises a plurality of identical phase shifters PS as schematically depicted in FIG. 3. The identical phase shifters are commanded all together using a same electrical control signal, generated by a control block CONTROL. With this coupling, each phase shifter increases/decreases by a same amount the optical path of the light in the waveguide of the array 3 to which it is coupled.

As already stated above, there is a fixed optical path difference $n_{eff} \cdot \Delta L$ between adjacent optical waveguides of the array 3. Thus, an increase of the effective refractive index will increase more in absolute terms in the optical path of a longer waveguide than the optical path of a shorter waveguide. For this reason, the number of phase shifters PS coupled to each waveguide of the array 3 depends on the length of the waveguide.

More precisely, the shortest/longest waveguide is coupled to at least one phase shifter PS (only one, in the example of FIG. 3) and each of the other optical waveguides is coupled to a number of identical phase shifters greater by a constant integer (1 in FIG. 3) than the number of identical phase shifters coupled to the longest/shortest of the shorter/longer optical waveguides.

This solution is particularly advantageous because it allows adjustment in a very accurate fashion of the effects of temperature variations. Indeed, the phase shifters PS may be precisely realized identical to each other. Moreover, the control signal, distributed in parallel to all phase shifters, does not undergo relevant drops along the electrical lines through which it is distributed. Thus all identical phase shifters are effectively commanded by the same signal.

Suitable phase shifters may be thermal phase modulators or electro-optic phase modulators. These devices are currently available and are well known to the skilled person, and for this reasons they will not be discussed further.

FIG. 4a depicts an embodiment of the arrayed waveguide grating demultiplexer having two networks of identical phase shifters as shown in FIG. 3 in order to increment or decrement the optical path difference $n_{eff} \cdot \Delta L$ between adjacent optical waveguides.

Figure 4B:
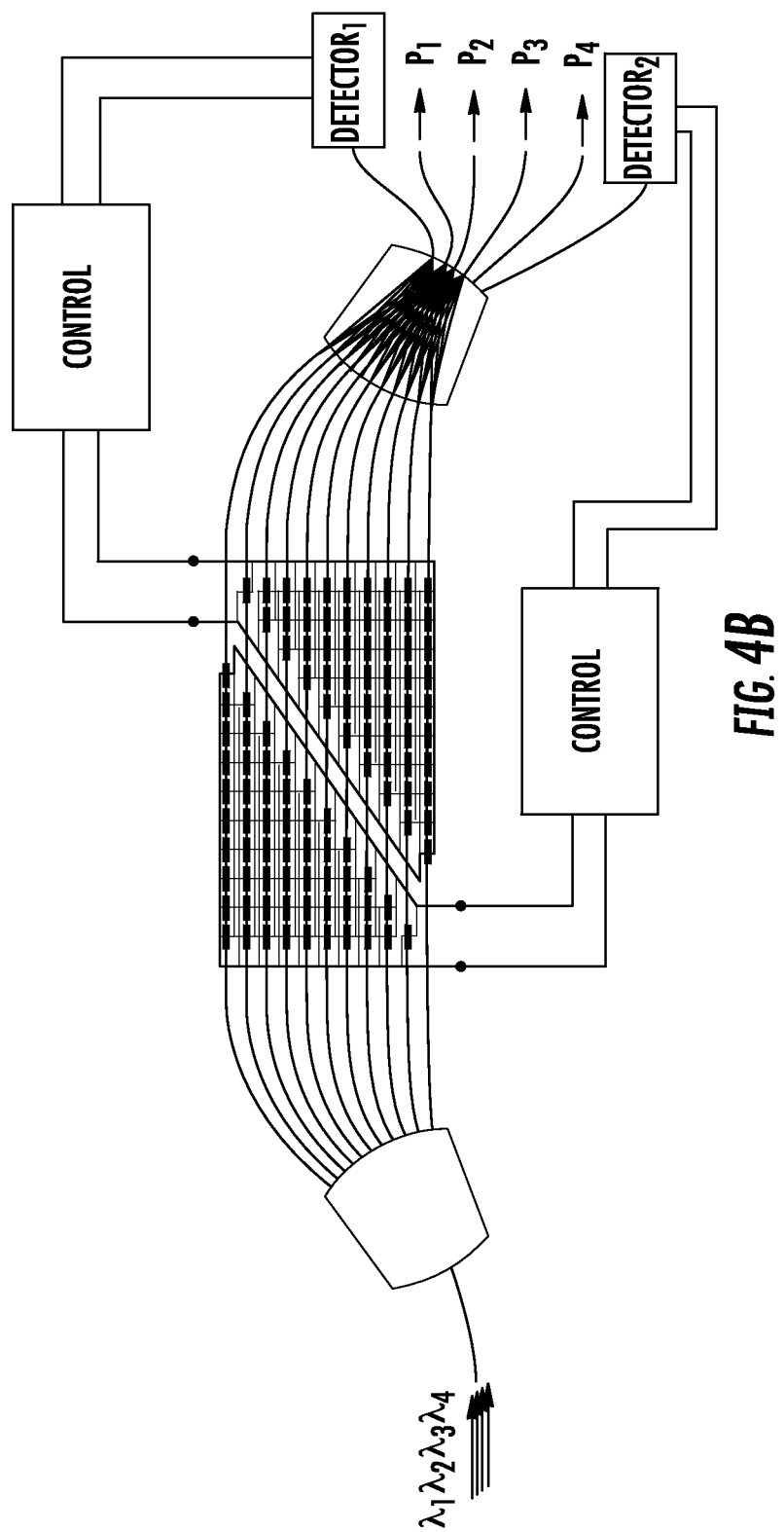
FIGS. 4b and 4c depict the arrayed waveguide grating demultiplexer of FIG. 4a in two different functioning conditions in which the optical path difference of the waveguides is to be adjusted.
Figure 4C:
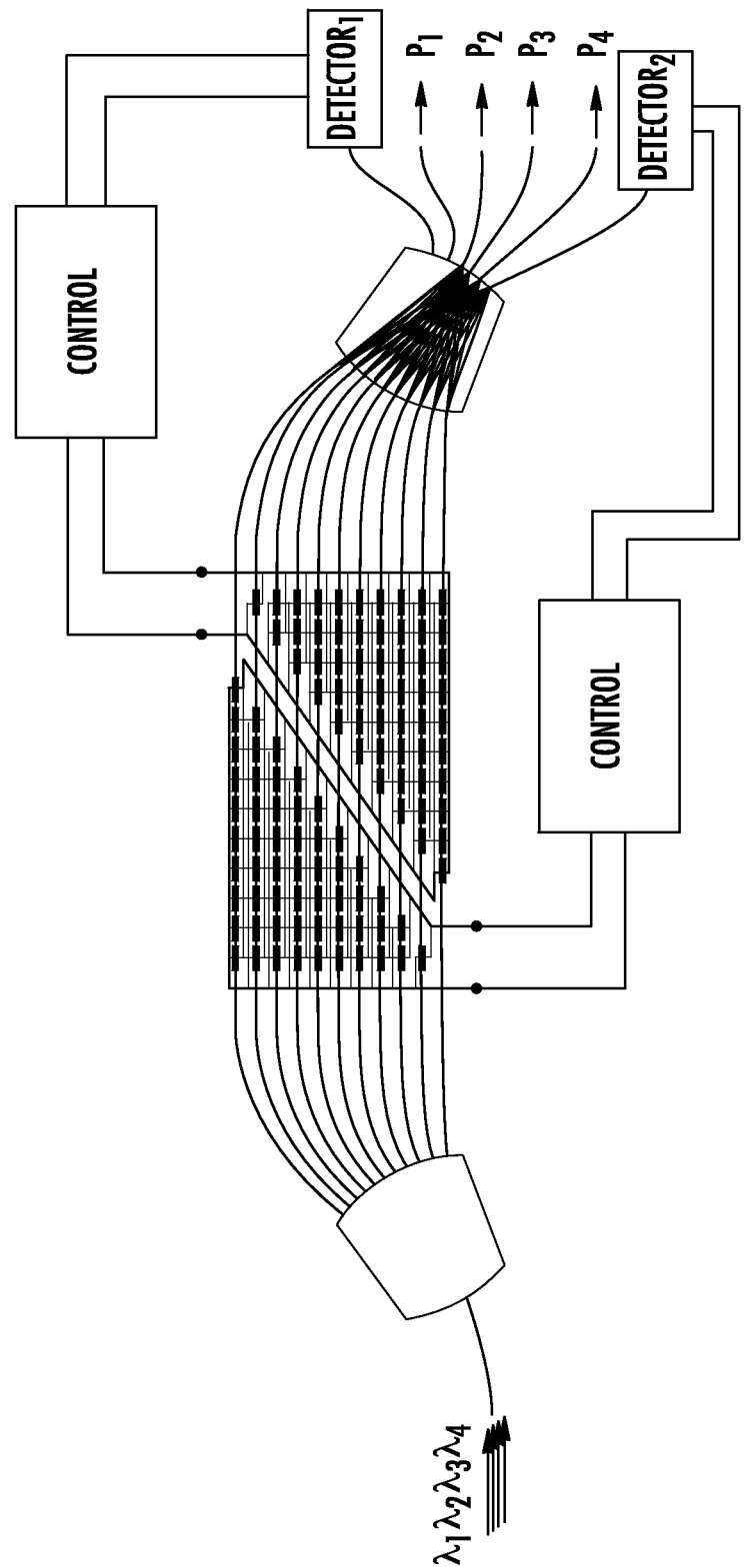

FIGS. 4b and 4c show the arrayed waveguide grating demultiplexer of FIG. 4a in two different functioning conditions in which a temperature variation has occurred and a control block CONTROL has to adjust the optical path difference $n_{eff} \cdot \Delta L$ between adjacent optical waveguides of the array 3.

Normally a phase shifter can increase or decrease the effective refractive index of a waveguide depending on the sign of the coefficient of the particular used effect but it cannot act in both directions. As an example to better explain this behavior, consider a thermal phase shifter acting on a waveguide with a negative thermo-optical coefficient. In this case, the phase shifter can only decrease the effective refractive index and not increase it.

With the particular architecture depicted in FIGS. 4a and 4b and its symmetry, it is possible to use the upper-left array to apply an equivalent incremental decrease and to use the lower-right array to apply an equivalent incremental increase of the effective index. This architecture allows in such a way both a red-shift and a blue-shift in the spectral output of the device.

To compensate a temperature variation in a certain range, i.e., [T1,T2], it is convenient to design and realize a device working nominally at a mid point of the range, T3=(T1+T2)/2. In this case, only one of the two phase shifters array may be used to compensate up to half of the total temperature variation, between T3 and T1 OR between T3 and T2.

If one and not two arrays of phase shifters are used it is possible to apply only a red or a blue shift and to compensate a temperature variation in the same range [T1,T2] it is possible to design and realize a device working nominally at T1 or at T2. An average of twice the electrical power needs to be spent to control the same device. The advantage of this energy savings is clear when the device to be controlled is used in a large data center where electrical power consumption and thermal control are normally important issues.

In operation, components of a same wavelength of output optical signals irradiated throughout the second free propagation region constructively interfere with a maximum intensity at a respective main focal spot located in a position determined by the wavelength of the output optical signals. In absence of temperature variations, the four multiplexed optical signals $\lambda_1$, $\lambda_2$, $\lambda_3$, $\lambda_4$ should be received at the positions $P_1$, $P_2$, $P_3$ and $P_4$. Because of variations of the effective refractive index, the focal spots at the second free propagation region are shifted counterclockwise (FIG. 4b) or clockwise (FIG. 4c) and at least an optical signal is not correctly received. In a standard AWG device the optical channels are uniformly shifted, and consequently, may not be correctly received.

In order to sense this improper functioning condition, according to an embodiment, the arrayed waveguide grating demultiplexer comprises at least a photo-detector (DETECTOR1, DETECTOR2) placed at a position located beyond an outermost of the focal spots of the second free propagation region so as to be not illuminated in normal functioning conditions, and to be illuminated when the arrayed waveguide grating demultiplexer undergoes a temperature variation greater than a minimum threshold. The photo-detector is configured to generate an electrical error signal corresponding to the intensity of an optical signal impinging thereon. This electrical error signal is provided as an input to a control block CONTROL configured to generate the control signal that commands the phase shifters PS shown in FIG. 4a.

Preferably, there will be two photo-detectors DETECTOR1 and DETECTOR2 placed respectively to sense a counterclockwise or clockwise shift of the focal spots of the output signals. It is helpful to specify that the control signal may be applied to the first or second phase shift array to correct the counterclockwise or clockwise shift of the focal spots of the output signals. The two detectors may be specifically used for this purpose, and in conjunction with the two arrays of phase shifters it is possible to operate a blue-shift or a red-shift of the signals in the output ports.

Figure 5A:
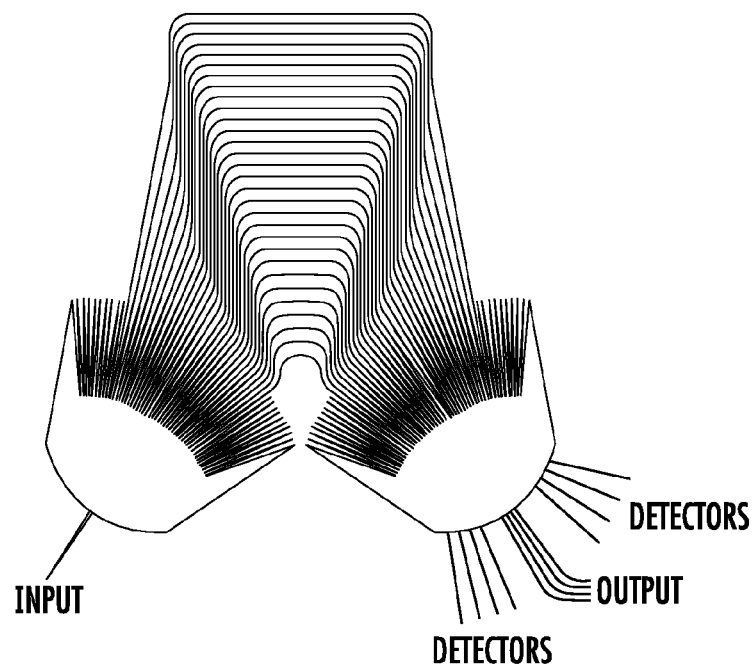
FIG. 5a schematically shows another embodiment of the arrayed waveguide grating demultiplexer that exploits secondary focal spots of the second free propagation region according to the present disclosure.
Figure 5B:
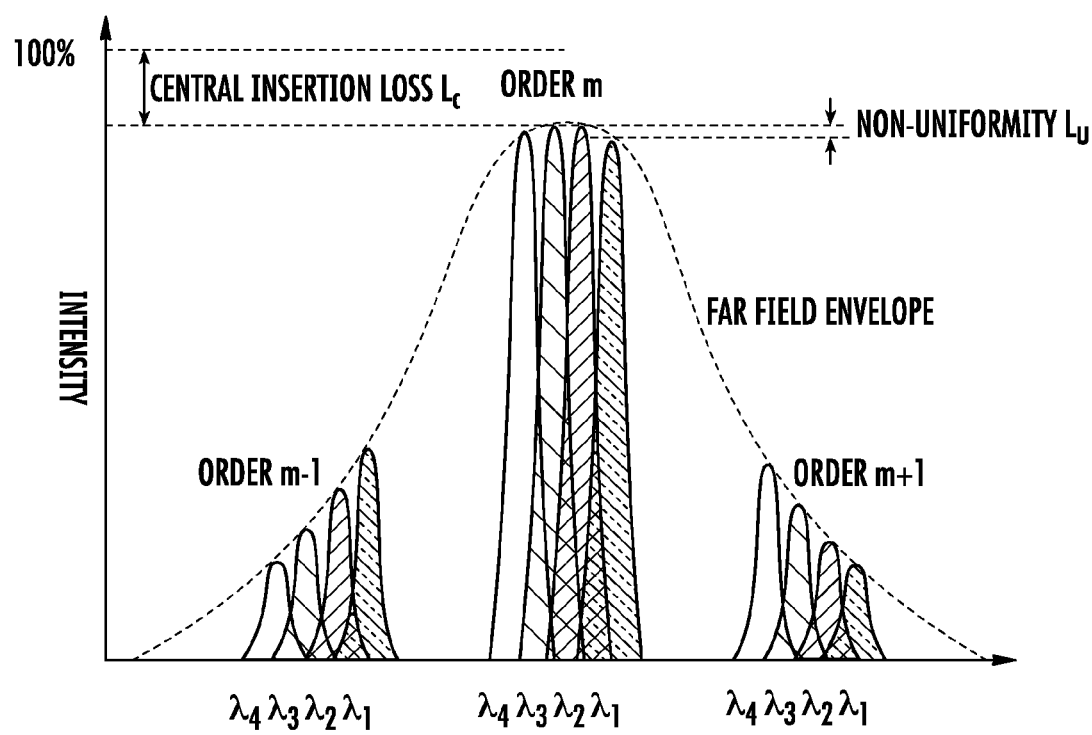
Figure 5C:
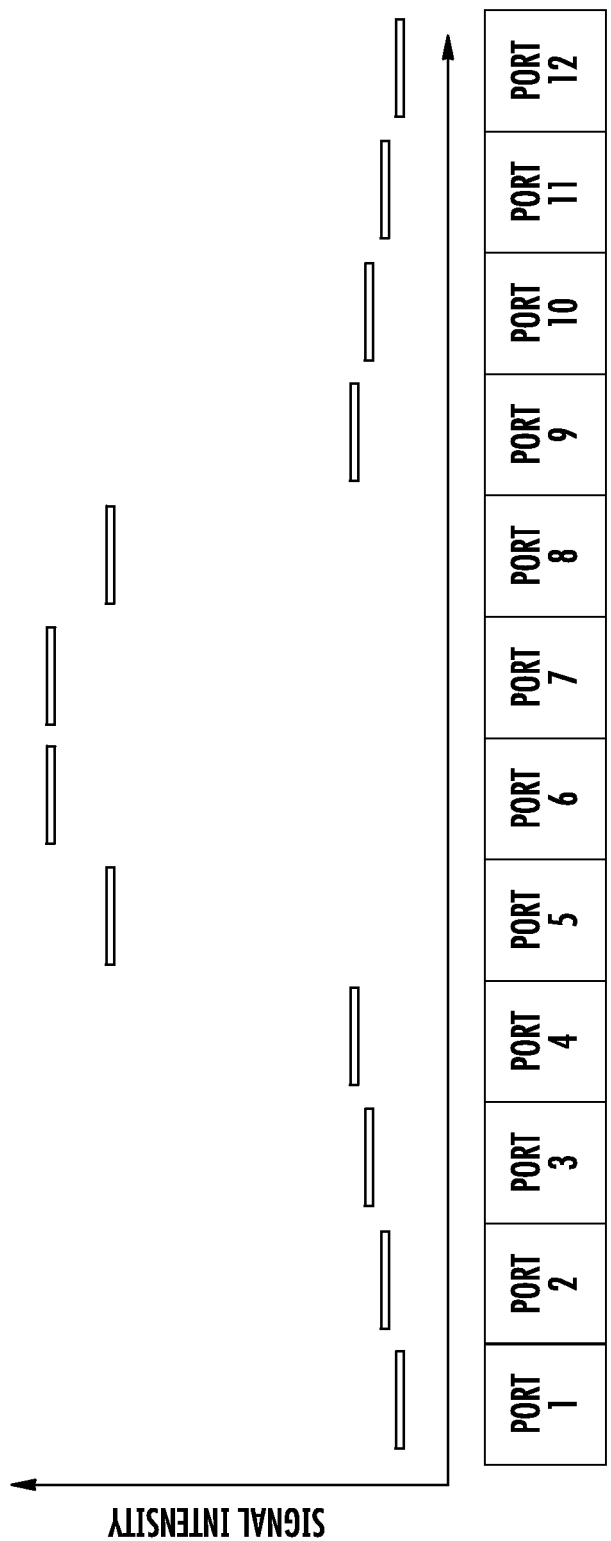

According to another embodiment as shown in FIG. 5a, it is possible to exploit the fact that, in operation, components of a same wavelength of the output optical signals also constructively interfere with a reduced intensity at a respective secondary focal spot that is located in a position of the second free propagation region depending on the wavelength, as schematically illustrated in the graph of FIG. 5b. In this embodiment, the arrayed waveguide grating demultiplexer comprises a plurality of photo-detectors DETECTORS, each placed at the position of a respective secondary focal spot and configured to generate a respective electrical error signal corresponding to the intensity of an optical signal impinging thereon. A control block CONTROL is configured to receive in input all the electrical error signals, and to generate accordingly, the control signal for commanding all phase shifters together in order to compensate the effects of temperature variations. This embodiment may be implemented with a multi-port detector, as shown in FIG. 5c, installed at the second free propagation region of the arrayed waveguide grating demultiplexer. In this embodiment, ports 5, 6, 7 and 8 are the output ports of the demultiplexer while ports 1, 2, 3, 4, 9, 10, 11 and 12 are used for monitoring.

Figure 6:
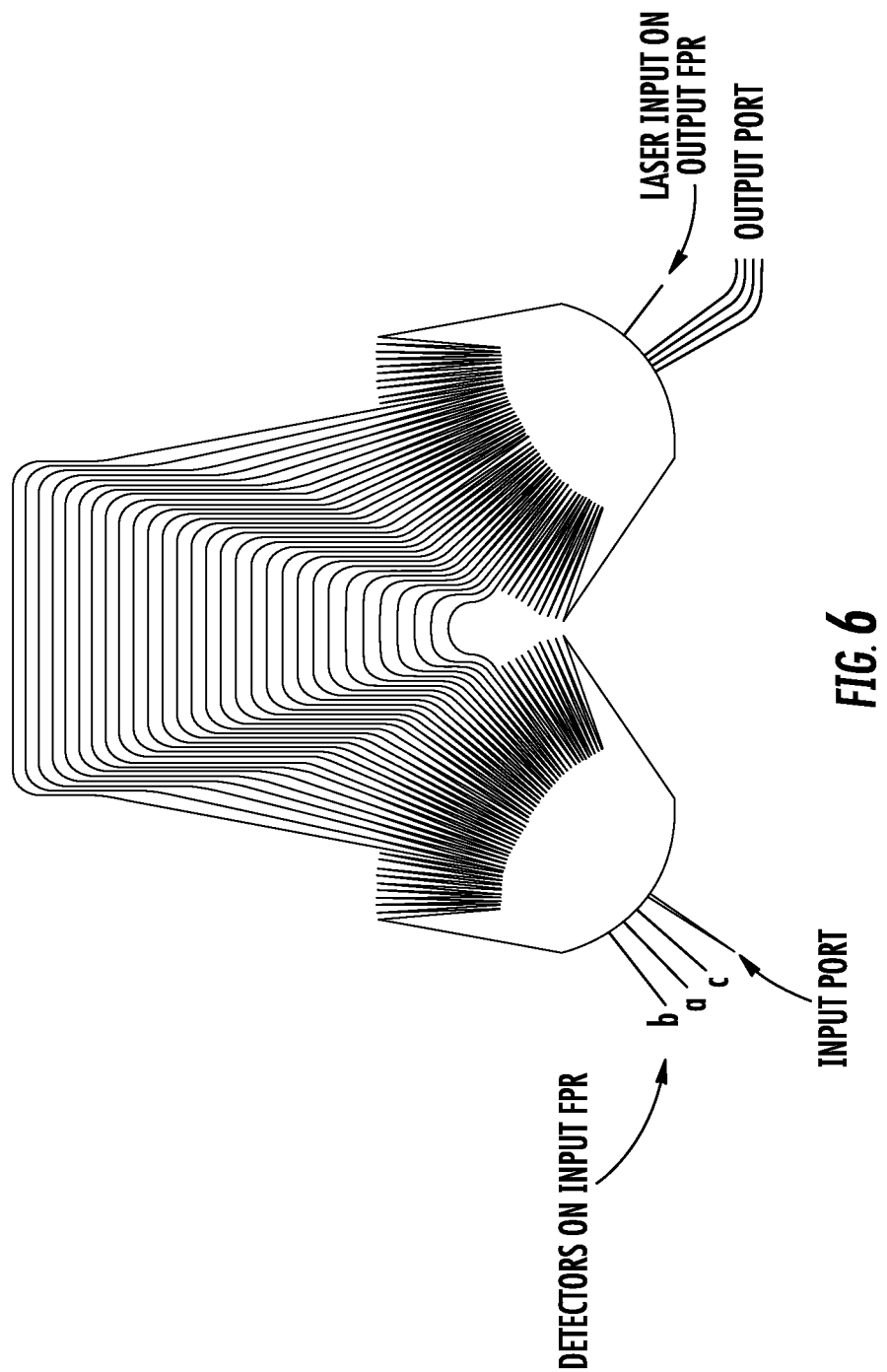
FIG. 6 schematically shows yet another embodiment of the arrayed waveguide grating demultiplexer that has a laser source for injecting an optical reference signal from the second free propagation region back to main focal spots of the first free propagation region according to the present disclosure.

According to yet another embodiment, as illustrated in FIG. 6, the arrayed waveguide grating demultiplexer includes a laser source placed in correspondence of a respective main focal spot of the second free propagation region. This laser source is configured to irradiate an optical reference signal from the second free propagation region to the first free propagation region throughout the array of optical waveguides. In operation, components of a same wavelength of the optical reference signal constructively interfere with a maximum intensity at a respective main focal spot located in a position a of the first free propagation region FPR, moving respectively towards b or c depending on temperature variation. By placing a plurality of photo-detectors each placed in correspondence of a respective one of the main focal spots a or b or c, it is possible to generate an electrical error signal that may be exploited by a control block (not shown in the figure) to generate the control signal for commanding all the phase shifters of FIG. 3.

Even if it has not been shown in detail, the skilled person will recognize that all embodiments of the arrayed waveguide grating demultiplexer of this disclosure may be equipped with an input waveguide configured to convey multiplexed optical signals of different wavelengths, a balanced power divider coupled to receive the multiplexed optical signals and to irradiate them towards radiating/capturing elements defined on end portions of the optical waveguides of the array, and a plurality of output waveguides each placed in correspondence of a respective main focal spot of the second free propagation region to collect a corresponding spectral component of the output signals.

That which is claimed is:

1. An arrayed waveguide grating demultiplexer, comprising:
    a first slab waveguide defining a first free propagation region;
    a second slab waveguide defining a second free propagation region;
    an array of optical waveguides ordered in sequence from a shortest optical waveguide to a longest optical waveguide, having first end portions and second end portions, respectively, to receive input optical signals throughout the first free propagation region and to irradiate output optical signals throughout the second free propagation region, with components of a same wavelength of the output optical signals constructively interfering at a respective main focal spot located in a position of the second free propagation region based on the wavelength;
    each optical waveguide, except for the shortest optical waveguide, being longer by a same amount than the optical waveguide that precedes in the sequence; and
    a plurality of identical phase shifters coupled to said array of optical waveguides, and configured to be commanded together by a same control signal, with each phase shifter being configured to change an optical path of an optical waveguide of said array of optical waveguides to which it is coupled by a same amount, as determined by the control signal;
    the shortest optical waveguide or the longest optical waveguide having at least one phase shifter coupled thereto, with each of said remaining optical waveguides having a number of phase shifters greater by a constant integer than the number of phase shifters coupled to the optical waveguide that precedes or follows in the sequence so that a difference in the number of phase shifters between adjacent optical waveguides is equal to the constant integer.

2. The arrayed waveguide grating demultiplexer of claim 1, further comprising:
a photo-detector placed at a position beyond an outermost of the main focal spots of the second free propagation region so as not to be illuminated in normal functioning conditions and to be illuminated when the arrayed waveguide grating demultiplexer undergoes a temperature variation greater than a threshold, said photo-detector being configured to generate an error signal corresponding to an intensity of an optical signal impinging thereon; and
a control block configured to receive as input the error signal and to generate the control signal.

3. The arrayed waveguide grating demultiplexer of claim 1, wherein in operation components of a same wavelength of the output optical signals also constructively interfere with a reduced intensity at a respective secondary focal spot located in a position of the second free propagation region depending on the wavelength; and further comprising:
a plurality of photo-detectors, each photo-detector placed at a position of a respective secondary focal spot and configured to generate a respective error signal corresponding to an intensity of an optical signal impinging thereon; and
a control block configured to receive as input all the error signals and to generate the control signal.

4. The arrayed waveguide grating demultiplexer of claim 1, further comprising:
a laser source placed in correspondence of a respective main focal spot of the second free propagation region, configured to irradiate an optical reference signal from the second free propagation region to the first free propagation region throughout said array of optical waveguides, wherein in operation components of a same wavelength of the optical reference signal constructively interfere with an increased intensity at a respective main focal spot located in a position of the first free propagation region depending on the wavelength;
a plurality of photo-detectors each placed in correspondence of a respective one of the main focal spots of the first free propagation region, each photo-detector being configured to generate a respective error signal corresponding to the intensity of an optical signal impinging thereon; and
a control block configured to receive as input all the electric error signals and to generate the control signal.

5. The arrayed waveguide grating demultiplexer of claim 1, wherein the first end portions and second end portions define a first array and a second array of radiating/capturing elements, respectively, to receive and to deliver optical signals throughout the first and second free propagation regions.

6. The arrayed waveguide grating demultiplexer of claim 5, further comprising:
an input waveguide configured to transmit multiplexed optical signals of different wavelengths;
a balanced power divider configured to receive the multiplexed optical signals and to irradiate them towards said first array of radiating/capturing elements; and
a plurality of output waveguides each placed in correspondence of a respective main focal spot of the second free propagation region to collect a corresponding spectral component of the output signals.

7. An arrayed waveguide grating demultiplexer, comprising:
a first waveguide defining a first free propagation region;
a second waveguide defining a second free propagation region;
an array of optical waveguides ordered in sequence from a shortest optical waveguide to a longest optical waveguide, having first end portions and second end portions, respectively, to receive input optical signals throughout the first free propagation region and to irradiate output optical signals throughout the second free propagation region;
each optical waveguide, except for the shortest optical waveguide, being longer by a same amount than the optical waveguide that precedes in the sequence;
a plurality of identical phase shifters coupled to said array of optical waveguides, and configured to be commanded together by a same control signal, with each phase shifter being configured to change an optical path of an optical waveguide of said array of optical waveguides to which it is coupled by a same amount, as determined by the control signal;
the shortest optical waveguide or the longest optical waveguide having at least one phase shifter coupled thereto, with each of said remaining optical waveguides having a number of phase shifters greater by a constant integer than the number of phase shifters coupled to the optical waveguide that precedes or follows in the sequence so that a difference in the number of phase shifters between adjacent optical waveguides is equal to the constant integer;
at least one photo-detector positioned so as not to be illuminated in normal functioning conditions and to be illuminated when the arrayed waveguide grating demultiplexer undergoes a temperature variation greater than a threshold, said at least one photo-detector being configured to generate at least one error signal corresponding to an intensity of an optical signal impinging thereon; and
a control block configured to generate the control signal based on the at least one error signal.

8. The arrayed waveguide grating demultiplexer of claim 7, wherein said at least one photo-detector is positioned beyond an outermost of main focal spots of the second free propagation region.

9. The arrayed waveguide grating demultiplexer of claim 7, wherein components of a same wavelength of the output optical signals constructively interfering at a respective main focal spot located in a position of the second free propagation region based on the wavelength, and also constructively interfere with a reduced intensity at a respective secondary focal spot located in a position of the second free propagation region depending on the wavelength;
said at least one photo-detector comprising a plurality of photo-detectors, each photo-detector placed at a position of a respective secondary focal spot and configured to generate a respective error signal corresponding to an intensity of the optical signal impinging thereon; and
said control block is configured to generate the control signal based on all the error signals.

10. The arrayed waveguide grating demultiplexer of claim 7, further comprising:
a laser source placed in correspondence of a respective main focal spot of the second free propagation region, configured to irradiate an optical reference signal from the second free propagation region to the first free propagation region throughout said array of optical waveguides, wherein in operation components of a same wavelength of the optical reference signal constructively interfere with an increased intensity at a respective main focal spot located in a position of the first free propagation region depending on the wavelength;

said at least one photo-detector comprising a plurality of photo-detectors each placed in correspondence of a respective one of the main focal spots of the first free propagation region, each photo-detector being configured to generate a respective error signal corresponding to the intensity of an optical signal impinging thereon; and said control block is configured to generate the control signal based on all the error signals.

11. The arrayed waveguide grating demultiplexer of claim 7, wherein the first end portions and second end portions define a first array and a second array of radiating/capturing elements, respectively, to receive and to deliver optical signals throughout the first and second free propagation regions.

12. The arrayed waveguide grating demultiplexer of claim 11, further comprising:
an input waveguide configured to transmit multiplexed optical signals of different wavelengths;
a balanced power divider configured to receive the multiplexed optical signals and to irradiate them towards said first array of radiating/capturing elements; and
a plurality of output waveguides each placed in correspondence of a respective main focal spot of the second free propagation region to collect a corresponding spectral component of the output signals.

13. A method for controlling an arrayed waveguide grating demultiplexer comprising a first slab waveguide defining a first free propagation region; a second slab waveguide defining a second free propagation region; an array of optical waveguides ordered in sequence from a shortest optical waveguide to a longest optical waveguide, having first end portions and second end portions, respectively, to receive input optical signals throughout the first free propagation region and to irradiate output optical signals throughout the second free propagation region; each optical waveguide, except for the shortest optical waveguide, being longer by a same amount than the optical waveguide that precedes in the sequence; and a plurality of identical phase shifters organized into symmetric arrays and
coupled to the array of optical waveguides, the shortest optical waveguide or the longest optical waveguide having at least one phase shifter coupled thereto, with each of the remaining optical waveguides having a number of phase shifters greater by a constant integer than the number of phase shifters coupled to the optical waveguide that precedes or follows in the sequence so that a difference in the number of phase shifters between adjacent optical waveguides is equal to the constant integer, the method comprising:
controlling the plurality of plurality of phase shifters organized into symmetric arrays with a same control signal for each array, with each phase shifter being configured to change an optical path of an optical waveguide of the array of optical waveguides to which it is coupled by a same amount, as determined by the control signal.

14. The method of claim 13, further comprising:
positioning a photo-detector beyond an outermost of main focal spots of the second free propagation region so as not to be illuminated in normal functioning conditions and to be illuminated when the arrayed waveguide grating demultiplexer undergoes a temperature variation greater than a threshold, the photo-detector being configured to generate an error signal corresponding to an intensity of an optical signal impinging thereon; and
positioning a control block configured to receive as input the error signal and to generate the control signal.

15. The method of claim 13, wherein components of a same wavelength of the output optical signals constructively interfering at a respective main focal spot located in a position of the second free propagation region based on the wavelength, and also constructively interfere with a reduced intensity at a respective secondary focal spot located in a position of the second free propagation region depending on the wavelength; and further comprising:
positioning a plurality of photo-detectors so that each photo-detector is at a position of a respective secondary focal spot and is configured to generate a respective error signal corresponding to an intensity of an optical signal impinging thereon; and
positioning a control block configured to receive as input all the error signals and to generate the control signal.

16. The method of claim 13, further comprising:
positioning a laser source in correspondence of a respective main focal spot of the second free propagation region, to irradiate an optical reference signal from the second free propagation region to the first free propagation region throughout the array of optical waveguides, wherein in operation components of a same wavelength of the optical reference signal constructively interfere with an increased intensity at a respective main focal spot located in a position of the first free propagation region depending on the wavelength;
positioning a plurality of photo-detectors so that each photo-detector is in correspondence of a respective one of the main focal spots of the first free propagation region, each photo-detector being configured to generate a respective error signal corresponding to the intensity of an optical signal impinging thereon; and
positioning a control block configured to receive as input all the electric error signals and to generate the control signal.

17. The method of claim 13, wherein the first end portions and second end portions define a first array and a second array of radiating/capturing elements, respectively, to receive and to deliver optical signals throughout the first and second free propagation regions.

18. The method of claim 17, further comprising:
providing an input waveguide to transmit multiplexed optical signals of different wavelengths;
providing a balanced power divider to receive the multiplexed optical signals and to irradiate them towards the first array of radiating/capturing elements; and
providing a plurality of output waveguides each placed in correspondence of a respective main focal spot of the second free propagation region to collect a corresponding spectral component of the output signals.

* * * * *